(12) United States Patent
Howard

(10) Patent No.: US 6,880,336 B2
(45) Date of Patent: Apr. 19, 2005

(54) SOLID STATE THERMAL ENGINE

(75) Inventor: Robert J. Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/643,372

(22) Filed: Aug. 20, 2003

(65) Prior Publication Data

US 2005/0039452 A1 Feb. 24, 2005

(51) Int. Cl.[7] .............................................. F01B 29/10
(52) U.S. Cl. ..................................... 60/527; 60/528
(58) Field of Search .......................... 60/527, 528, 529

(56) References Cited

U.S. PATENT DOCUMENTS

| | | | |
|---|---|---|---|
| 4,075,846 A | * | 2/1978 | Li ............................. 60/527 |
| 4,150,544 A | * | 4/1979 | Pachter ...................... 60/527 |
| 4,246,754 A | * | 1/1981 | Wayman ..................... 60/527 |
| 4,275,561 A | | 6/1981 | Wang |
| 4,305,250 A | | 12/1981 | Cory |
| 5,457,956 A | | 10/1995 | Bowman et al. |
| 5,650,568 A | | 7/1997 | Greiff et al. |
| 5,749,226 A | | 5/1998 | Bowman et al. |
| 5,836,150 A | | 11/1998 | Garcia |
| 5,842,312 A | * | 12/1998 | Krumme et al. ........... 52/167.1 |
| 5,941,079 A | | 8/1999 | Bowman et al. |
| 6,057,149 A | | 5/2000 | Burns et al. |
| 6,287,765 B1 | | 9/2001 | Cubicciotti |
| 6,447,871 B1 | | 9/2002 | Hawkins |
| 6,472,794 B1 | | 10/2002 | Shibaike et al. |
| 6,498,870 B1 | | 12/2002 | Wu et al. |
| 2001/0046703 A1 | | 11/2001 | Burns et al. |
| 2002/0055242 A1 | | 5/2002 | Uhlenbrock et al. |
| 2002/0190604 A1 | | 12/2002 | Shibaike et al. |

* cited by examiner

Primary Examiner—Hoang Nguyen
(74) Attorney, Agent, or Firm—Mark A. Wurm

(57) ABSTRACT

A solid state thermal engine has two drums, each drum having two pulleys positioned thereon. Each pulley on the one drum is coupled to its counterpart pulley on the other drum via a belt, chain or other connector. One of the belts, referred to as the active belt, is heated which causes the active belt to expand. The expansion decreases the tension on the active belt, and further causes the active belt and the pulleys on which it is positioned to rotate. In a preferred embodiment, the active belt is manufactured out of a memory metal such as NITINOL. In another embodiment, a system of several drums and pulleys are used to implement a chain fall device.

9 Claims, 3 Drawing Sheets

SOLID STATE THERMAL ENGINE

FIELD OF THE INVENTION

The present invention relates to solid state thermal engines, and in particular, solid state thermal engines that use shape changing and shape memory alloys.

BACKGROUND OF THE INVENTION

Micro-miniature machines and robots are used in applications that require efficiency and compactness. These machines and robots are normally powered by electric and/or pneumatic motors. Unfortunately, these motors are bulky, complex, and require tight machine tolerances. To overcome the shortcomings of motors that power micro-miniature machines and robots, shape changing alloys such as NITINOL have been used as actuators in place of these motors and machines. While the art has experienced some success in the use of shape changing alloys in micro-miniature machines and robots, simpler and more reliable actuators and motors are needed.

SUMMARY OF THE INVENTION

The present invention is a solid state thermal engine having a belt and pulley system. In its simplest form, two pulleys are positioned on each of two drums. Each pulley is connected via a belt or other means to a corresponding pulley on the other drum. A portion of one of the belts, referred to as the active belt, is heated, causing the active belt to expand. The expansion of the active belt results in decreased tension on the active belt, and rotation of the entire belt around its respective pulleys. The rotation of the belts and pulleys can be converted into a linear force.

In another embodiment, a system of three drums and several pulleys are interconnected by a belt. One of the drums is allowed to move laterally towards and away from the other drums. Another drum functions to take up and release slack in the belt. Heating a portion of the belt interconnecting these drums and pulleys causes that portion of the belt to expand and move as in the previously described embodiment. The heating and movement of the belt causes the drum capable of lateral movement to function as a classic chain fall.

It is therefore an object of a preferred embodiment of the present invention to cause rotation in a pulley system through the heating and expansion of the belt or other connecting means of the pulley system.

BRIEF DESCRIPTION OF THE DRAWINGS

FIG. 1a is a side view of the rotary thermal embodiment of FIG. 1.

DETAILED DESCRIPTION OF THE INVENTION

Figure 1:
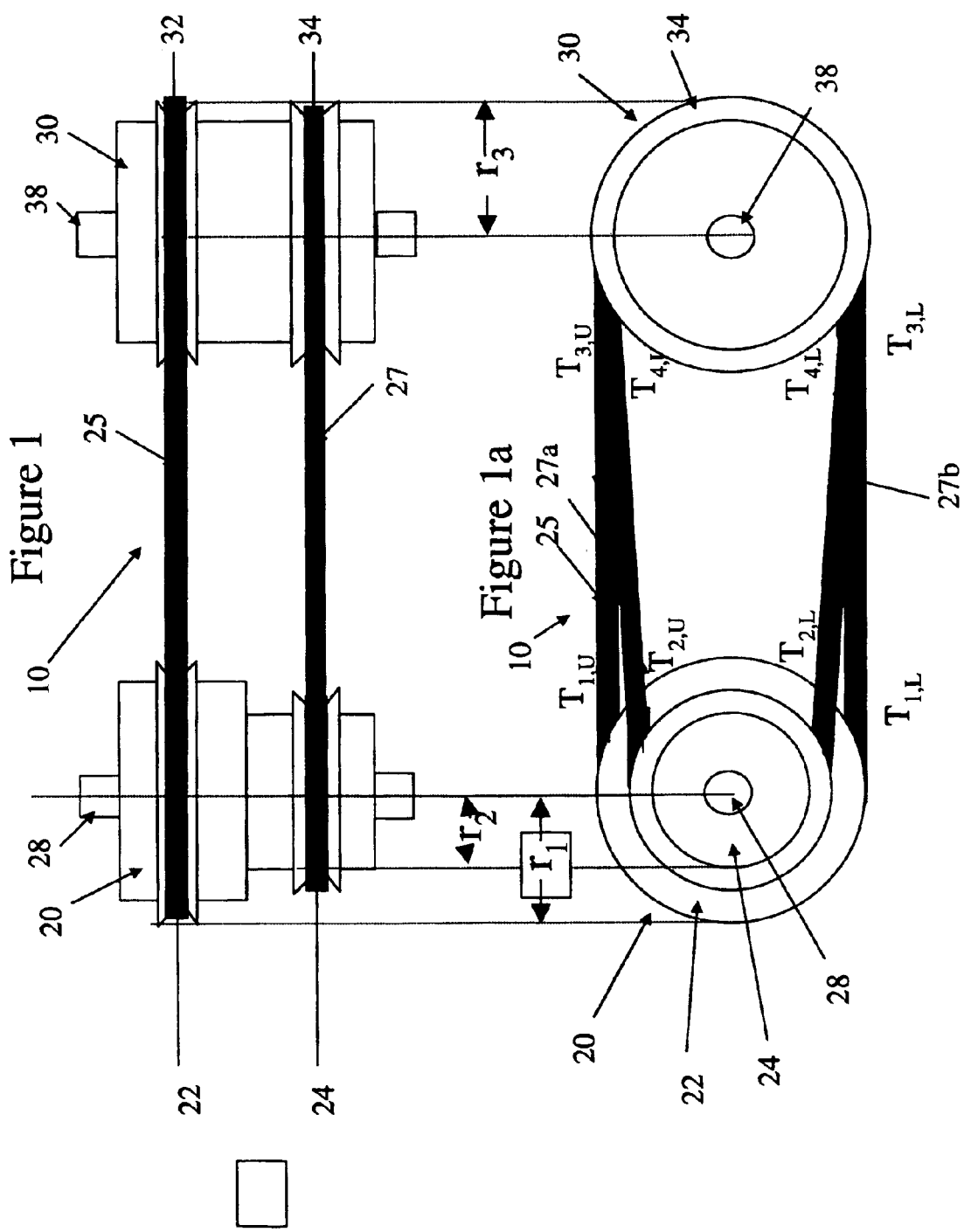
FIG. 1 is an elevation view of a preferred embodiment of the present invention using a rotary thermal design.

The present invention is a solid state thermal engine. A first embodiment is a rotary thermal actuator 10 and is illustrated in FIGS. 1 and 1a. FIG. 1 is an elevation view of the actuator 10, and FIG. 1a is a side view of the actuator 10.

The actuator 10 has drums 20 and 30 with axes 28 and 38 respectively. Attached to drum 20 are pulleys 22 and 24, and attached to drum 30 are pulleys 32 and 34. The radius (r2) of pulley 24 should be smaller than the radius (r1) of pulley 22. Pulleys 32 and 34 should have the same radius (r3). Pulleys 22 and 32 are connected to each other by a belt 25, and pulleys 24 and 34 are connected to each other by a belt 27. A ribbon, wire or coil spring could also be used in place of one or both of the belts 25 and 27. The belts 25 and 27 are under sufficient tension so that they do not slip over their respective pulleys. Pulleys 22 and 24 are locked together so that they turn with the same angular velocity, and pulleys 32 and 34 are locked together so that they also turn with the same angular velocity.

Belt 25 should be made out of a material that has a relatively low expansion coefficient, and is referred to as the idler belt. An example of a material with such a relatively low expansion coefficient is a simple metal chain. In contrast, belt 27 should be made out of a material that has a relatively large thermal expansion coefficient, and is referred to as the active belt. An example of a material with such a relatively large thermal expansion coefficient is the memory metal NITINOL. Other memory metals that have a relatively large expansion coefficient in a particular temperature range could also be used. Indeed, while it is preferred to use a memory metal because of its relatively large expansion coefficient, the present invention would also work using normal non-memory metals (or any solid material and modality that can induce shrinkage and expansion) as the active band 27 as long as larger temperature ranges are employed in the working region.

The actuator 10 with its configuration of belts and pulleys has tensions and torques, and understanding the operation of the actuator 10 can best be understood by examining these forces. The total torque on drum 20 (at a resting state) is given by the following equations (See FIG. 1a):

$$\text{Torque Drum } 20 = (T_{1u} + T_{1l}) * r1 + (T_{2u} + T_{2l}) * r2$$

$$\text{Torque Drum } 30 = (T_{3u} + T_{3l} + T_{4u} + T_{4l}) * r3$$

where r2<r1.

If the tensions are assumed to be nearly parallel, at equilibrium, with the entire active band 27 at the same temperature, the following will hold true (where minus sign indicates direction of the force):

$$T_{1u} = -T_{3u} = -T_{1l} = T_{3l}$$

$$T_{2u} = -T_{4u} = -T_{2l} = T_{4l}$$

Figure 3:
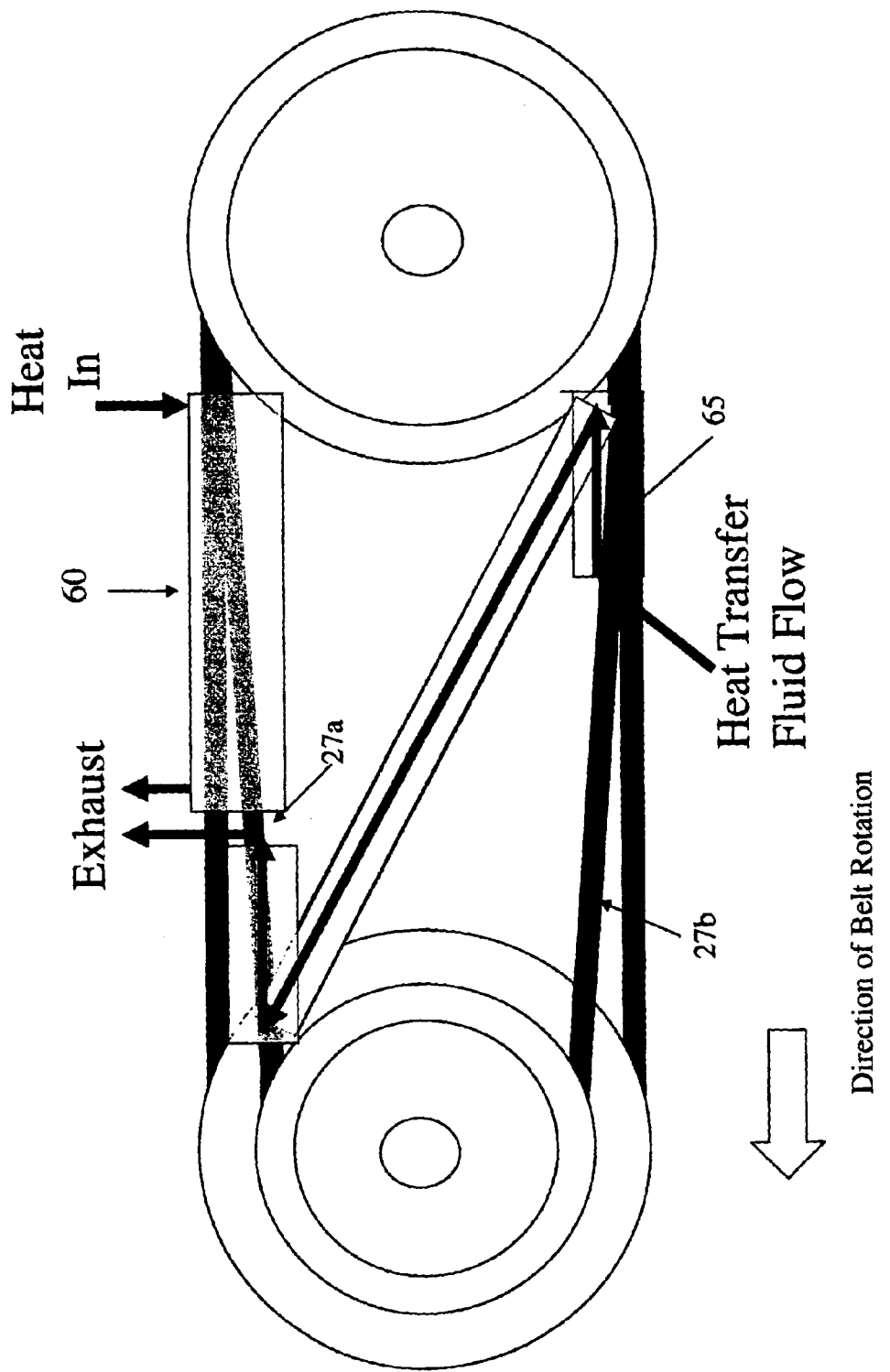
FIG. 3 illustrates the use of a heat exchanger in connection with a preferred embodiment of the present invention.

With the belts and pulleys of the actuator 10 at equilibrium, which may include a restraining force, a portion of the active belt 27 is heated, while the remaining portion of the active belt 27 is cooled. For example, in FIG. 1a, the top portion 27a of active belt 27 is heated, and the bottom portion 27b is cooled. Direct application of radiated heat from a heating element to the active belt 27a could be used, or the active belt 27a could be heated through chemical or electrical means. Additionally, FIG. 3 illustrates a heating method using a fluid heat exchanger. In the heat exchanger, unheated fluid enters into the exchanger at point 65. The fluid, although unheated, still has enough heat to pre-heat the cool portion of the belt 27b before it travels up to the active area of the belt. The fluid then travels as indicated by the arrows in FIG. 3 to the heating element 60 that heats the fluid. The heated fluid then transfers its heat energy to the active portion of the belt 27a.

Upon heating, the active belt 27a will expand, and if the position of drum 20 and drum 30 do not change with respect to each other (i.e. the distance between drum 20 and drum 30 does not change), $T_{2u}$ and $T_{4u}$ will decrease in magnitude, while all the other forces ($T_{1u}$; $T_{3u}$; $T_{1l}$; $T_{3l}$; $T_{2l}$; $T_{4l}$) will remain unchanged. If the decrease in magnitude of $T_{2u}$ and $T_{4u}$ is represented by eps, then:

$$\text{Torque Drum } 20 = (T_{1u} + T_{1l})*r1 + (T_{2u} - eps + T_{2l})*r2$$

$$\text{Torque Drum } 30 = (T_{3u} + T_{3l} + T_{4u} - eps + T_{4l})*r3.$$

Or, because all other forces are at equilibrium, $$\text{Torque Drum } 20 = -eps*r2$$

$$\text{Torque Drum } 30 = eps*r3.$$

The total torque on the system then becomes:

$$\text{Total Torque} = eps*(r3 - r2).$$

If r3 is greater than r2, a positive torque will be exerted on the system, and drums 20 and 30 will rotate when any restraining forces upon the drums are released.

For maximum efficiency, the cooled portion of the active belt 27b should enter the area where the heat is supplied and the change in length of the active portion of the belt 27a must occur before useful work can be done. Likewise, the restoration of the original temperature/length of the active belt 27 should occur after it has left the cold side of the pulley 24. In other words, heat should be applied after the active belt 27a has rolled off the first pulley and cooling of that belt should not occur until it has rolled off the second pulley. If the expansion/contraction of the active belt 27a does not occur between the pulleys 24 and 34, no useful work will be done since work is given by the integral of F*dL (where F is the force and dL is the change in length of the active band 27a).

The physics of the rotary thermal actuator 10 dictates that the power output of the actuator 10 is determined by the ability to deliver thermal energy to the heated belt 27a and the strength of the materials (i.e. belts 25, 27) that are used. Consequently, actuators in the range of several cubic centimeters in size can easily deliver output power on the order of watts, and larger actuators could actually be used for power generation. Moreover, the thermal rotary actuator 10 could be used to produce linear motion. For example, the rotary output from the actuator 10 could be coupled to a take up reel.

To illustrate the power generation capability and general functionality of the present invention, consider the following example of a thermal rotary actuator as depicted in FIG. 1 with a solid NITINOL belt. The thermal conductivity, k, of NITINOL is approximately 0.1 watts/cm-° C. The density of NITINOL is 6.45 grams/cm$^3$. The thermal capacity, K, of NITINOL is around 25 Joules/gram. The high heat capacity of NITINOL is due to the fact that a phase transition is involved. The transformation of NITINOL occurs over about a 20° C. range.

Turning to the dimensions of the belt in this example, assume that the active portion of the belt has a thickness of 0.01 centimeters and a width of 0.2 centimeters. Further, assume that the thermal transition of the belt occurs in a region of the belt that is 1 cm in length. Given these assumptions, the area, A, of the belt is 0.002 cm$^2$, the volume, V, is 0.002 cm$^3$ (0.01 cm*0.2 cm*1 cm), the mass of the belt is 0.0013 grams (6.45 grams/cm$^3$*0.002 cm$^3$), and the thermal capacity, K, is 0.325 Joules (25 Joules/gram*0.013 grams). Moreover, NITINOL is reported to achieve a stress of about 700,000 Newtons/cm$^2$, with a 4% strain when going through the transition temperature region. For the belt in this example, this translates to a force, F, of 1400 Newtons.

Turning now to the heating of the active belt, assume that the temperature of the active portion of the belt is raised 40° C. Then, using a simplified model for thermal conductivity, the time that it takes to raise the temperature of the active portion of the belt by 40° C. is given by the following: $K/(2*\Delta T*A*k/h) = 0.325/(2*40*0.002*0.1/0.01) = 0.203$ seconds.

As can be seen from the above equation, if the temperature differential is lowered, there will be an increase in the response time, and a corresponding decrease in the speed at which the thermal engine operates.

The expansion of a belt upon heating is given by the following integral:

$$\Delta L = \int a(T(l))dl \qquad \text{Equation 1}$$

where the integral is evaluated in the range of 0 through L—L being the length of the portion of the active band to which heat is applied. T is the temperature of the band. It is assumed in this example that the expansion coefficient, α, has a constant value above and below the transition temperature range, and another higher value in the transition temperature range. That is, $$a(T) = \begin{matrix} a_0 & T < T_0 \\ a_1 & T_0 \leq T < T_1 \\ a_0 & T \geq T_1 \end{matrix} \qquad \text{Equation 2}$$

so that $a_1 > a_0$.

This assumption is permissible because the coefficients of expansion are generally asymptotic to the values outside the transition region.

In this example, it is further assumed that T(l) has the form:

$$T(l) = \begin{matrix} T_0 & T < T_0 \\ T_0 + ((T_1 - T_0)/L)*l & T_0 \leq T < T_1 \\ T_1 & T \geq T_1 \end{matrix} \qquad \text{Equation 3}$$

Substituting the equations for a(T) (Equation 2) and T(l) (Equation 3) into the integral (Equation 1), and performing the integration, gives:

$$\Delta L = 0.5*(a_1(T_1 - T_0))*L = (\epsilon/2)*L$$

Where ε is the total fractional expansion in the transition temperature range. It is noted that the expansion in the non-transition temperature range is ignored since it is comparatively small.

The differential pulley performance, i.e. the distance that the belt moves for a given expansion of the belt, is given by:

$$dD/dl = 1/(l-(r_1/r_2)).$$  Equation 4

The net torque exerted on the drum will then be given by:

$$\tau = F*(r_2-r_1).$$  Equation 5

Where $r_1$ and $r_2$ are the diameters of the pulley that are on the drum with the different sized pulleys (See FIG. 1). For movement of the belt to occur, D, the distance the band moves, must be greater than L, the region of the active belt where the temperature transition occurs. Mathematically, this means that $$L*(dD/dL1) > L, \text{ or}$$

$$(\epsilon/2)*(1/1-(r_1/r_2)) > 1.$$  Equation 6

Consequently, the ratio of the pulley diameters should be around 0.98. This ratio holds true for the solid NITINOL belt used in this example. Other geometries and belt materials will produce different values. If the ratio of the solid NITINOL belt is indeed 0.98, this implies that D is approximately 50.

In light of the above calculations, if the transition length, L, is set at 1 centimeter, and since it takes 0.203 seconds to heat the belt as calculated above, the belt in theory could achieve a velocity of 1 cm/0.203 seconds, or approximately 5 cm/sec. If the pulley has a radius of 1 cm, the resulting torque would be:

$$1400 \text{ Newtons}*0.01 \text{ meters} = 14 \text{ Newton meters}$$

The angular velocity is given by dividing the velocity by the circumference of the pulley, such that:

$$5/(2*\pi*0.5) = 1.59 \text{ radians/sec.}$$

Therefore, if enough heat could be applied to the active portion of the belt, and the device itself has adequate physical strength, the output power of the thermal engine is this example could be:

$$17*1.59 = 27 \text{ watts.}$$

It should be noted that the ability to deliver heat to the active portion of the belt, dissipate heat from the cooled portion of the belt, and the strengths of the materials used to build the thermal engine would in all likelihood limit the power produced by the thermal engine to smaller values.

Figures 2, 2A:
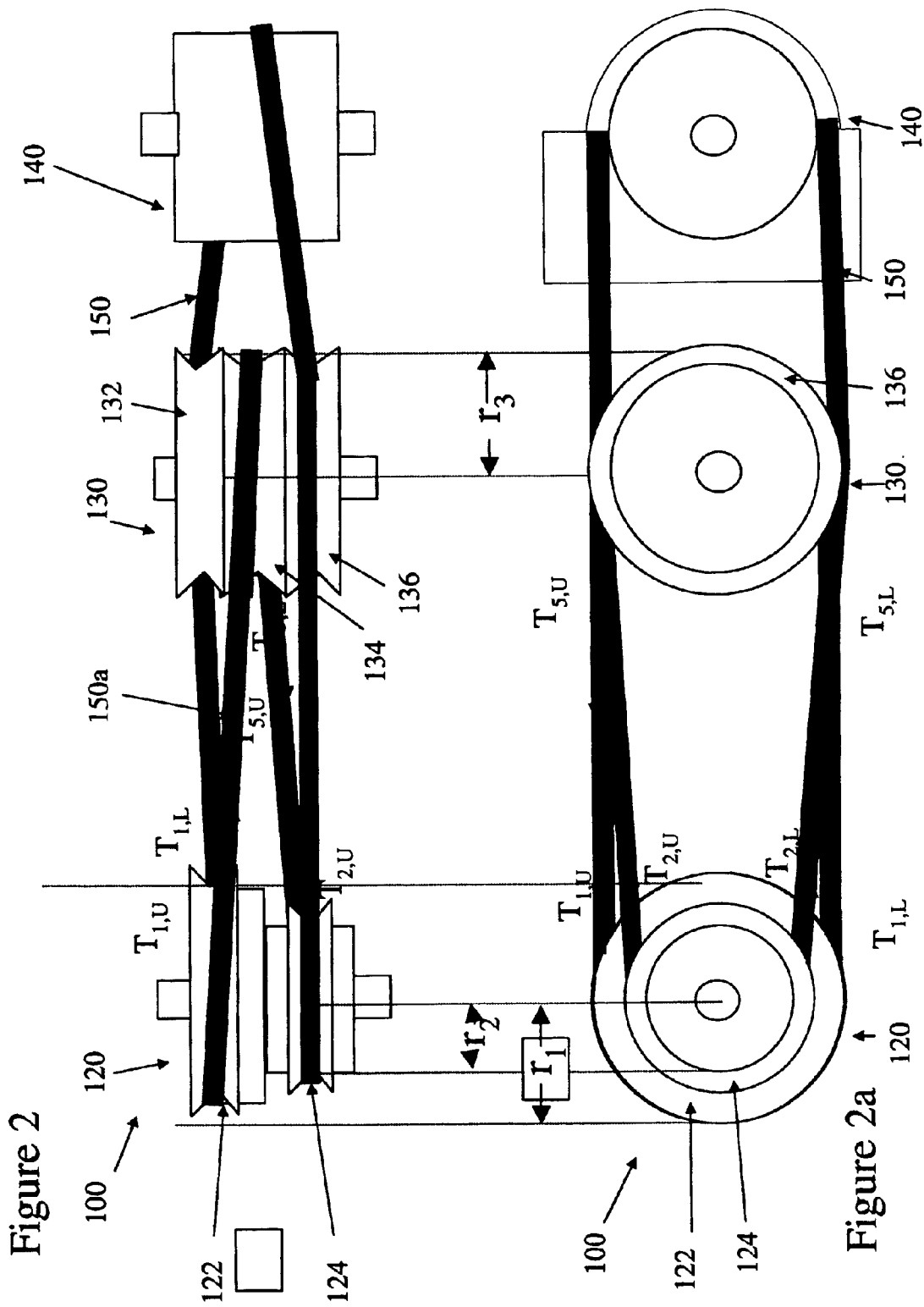
FIG. 2 illustrates a preferred embodiment of the present invention using a linear thermal actuator.
FIG. 2a is a side view of the linear thermal actuator embodiment of FIG. 2.

Another linear thermal actuator 100 is depicted in FIGS. 2 and 2a. In actuator 100, a single belt 150 interconnects drums 120, 130 and 140. Attached to drum 120 are pulleys 122 and 124. Pulley 122 should be larger than pulley 124. Pulleys 122 and 124 are fixed to the drum 120 so that they rotate at the same angular velocity. Drum 120 is not fixed in its position and may move towards and away from drum 130. Attached to drum 130 are pulleys 132, 134, and 136. Pulleys 132, 134 and 136 are freewheeling, but the belt 150 should not be permitted to slip over these pulleys. Either pulleys 132 and 134, or pulleys 134 and 136 are locked together so that they rotate with the same angular velocity. If pulleys 132 and 134 are locked together, pulley 136 is uncoupled from those two pulleys. If pulleys 134 and 136 are locked together, pulley 132 is uncoupled from those two pulleys. Drum 140 is a simple drum that acts as an idler pulley and is used to take up the slack of the belt 150.

The mobility of drum 120 permits the linear thermal actuator 100 to function much like a classic chain fall such as those that are used in a machine shop to hoist engines and other heavy equipment. That is, the force exerted is amplified at the expense of the distance that the chain or belt has to move over the pulleys. Specifically, rotation of the idler pulley will cause pulleys 122 and 124 to operate like a chain fall. To rotate the idler pulleys on drum 130, the working band 150a is heated, and based on the same principles of torques and tensions as explained in connection with FIG. 1, the working band expands, causing a decrease in tension/torque of the working band 150a, thereby causing the pulleys on drum 130 to rotate. The rotation of the pulleys on drum 130 causes the belt 150 to move around the circuit of the drums 120, 130 and 140, causing pulleys 122 and 124 to operate like a chain fall.

As alluded to earlier, almost any heat source can be used to heat the active belts 27a and 150a and thus power the solid state thermal engines 10 and 100. Direct radiated heating and use of a heat exchanger have already been disclosed, and other examples include chemical reactions, electrical heating and solar power. If direct electrical heating of the active belts 27a and 150a is used, the heat should be removed from the normally cool portion of the band. While each heating method has its own advantages and disadvantages, direct electrical resistance heating would be more efficient for the linear thermal actuator 100 because of the longer path of the belt 50.

While the invention has been described in its preferred embodiment, it is to be understood that the words used are words of description rather than limitation and that changes may be made within the purview of the appended claims without departing from the true scope and spirit of the invention in its broader aspects.

What is claimed is:

1. A solid state thermal engine comprising:
   a first drum;
   a second drum;
   a third drum;
   a first and second pulley positioned on said first drum;
   a third, fourth, and fifth pulley positioned on said second drum; and
   a belt interconnecting said first, second and third drums;
   wherein a portion of said belt is heated, said heating causing said belt to expand and to reduce the tension on said belt, thereby causing said first drum to move transversely towards and away from said second drum to provide linear actuation.

2. The solid state thermal engine according to claim 1, wherein said first pulley comprises a greater radius than said second pulley.

3. The solid state thermal engine according to claim 1, wherein said third, fourth and fifth pulleys comprise a greater radius than said first pulley.

4. The solid state thermal engine according to claim 1, wherein said third and fourth pulleys are connected so that said third and fourth pulleys rotate with the same angular velocity.

5. The solid state thermal engine according to claim 1, wherein said fourth and fifth pulleys are connected so that said fourth and fifth pulleys rotate with the same angular velocity.

6. The solid state thermal engine according to claim 1, wherein said belt is heated by a heat exchanger.

7. The solid state thermal engine according to claim 1, wherein upon said heating of said belt, said solid state thermal engine functions as a chain fall.

8. The solid state thermal engine according to claim 1, wherein said heating is performed using a regenerative heat exchanger.

9. A solid state thermal engine comprising:

a first drum;

a second drum;

a third drum;

a first and second pulley positioned on said first drum;

a third, fourth, and fifth pulley positioned on said second drum; and a belt interconnecting said first, second and third drums;

wherein a portion of said belt is heated by a regenerative heat exchanger, said heating causing said belt to expand and to reduce the tension on said belt, thereby causing said first drum to move transversely towards and away from said second drum to provide linear actuation.

* * * * *